Figure 1:
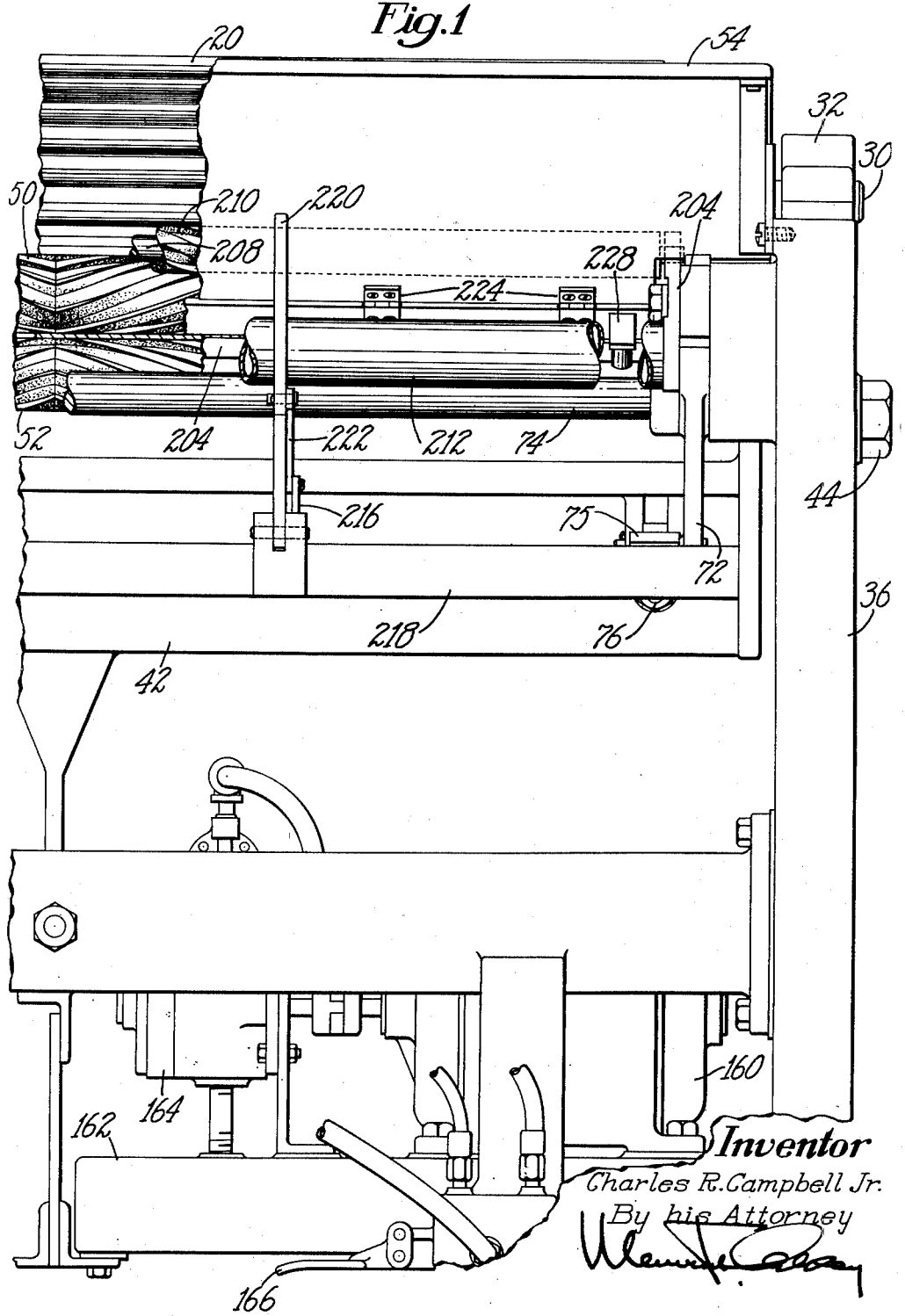

May 13, 1952 C. R. CAMPBELL, JR 2,596,125
THROUGH-FEED STAKING MACHINE
Filed May 23, 1951 2 SHEETS—SHEET 2

Inventor
Charles R. Campbell Jr.
By his Attorney

Patented May 13, 1952

2,596,125

UNITED STATES PATENT OFFICE 2,596,125

THROUGH-FEED STAKING MACHINE

Charles R. Campbell, Jr., Beverly, Mass., assignor to United Shoe Machinery Corporation, Flemington, N. J., a corporation of New Jersey Application May 23, 1951, Serial No. 227,889

8 Claims. (Cl. 69—34)

This invention relates to machines for treating hides, skins and leather. As herein illustrated the invention is embodied in a through-feed machine for performing staking operations on tanned hides and skins, although it will be recognized that in various novel aspects the invention has utility in other types of staking machinery than that selected for illustration.

Full-width staking machines now in use commonly require one introduction of a spread-out workpiece to their staking tools for treatment of a first portion and then, to complete the operation on the remaining untreated portion, the workpiece must be reversed end-for-end and again introduced to the tools. Such two-stage handling of hides and skins possesses obvious advantages over earlier staking methods requiring many repeated manual operations on narrow, overlapping surfaces completely to treat a single workpiece. Yet a re-introduction of a hide or skin to staking tools, especially of a full-width workpiece or of a side to full-width tools, is time-consuming and burdensome. This is particularly true when it is remembered that, in addition to often being of generally unwieldy size and weight, the very irregularly shaped workpieces may be flaccid in parts as well as quite stiff in other portions of the same workpiece.

In view of the circumstances noted it is an object of this invention to provide an improved staking machine for treating the entire length and width of a workpiece in but a single handling or continuous feeding movement of the work relatively to the tools. A further object of this invention is to provide supplemental means of simple construction for adapting a full-width leather treating machine, otherwise requiring in its operation more than one work-feeding movement, to a machine necessitating merely a single through-feed passage of the work for effecting its complete staking treatment.

To the attainment of these objects a feature of the invention resides in the combination with work feeding means and associated primary work treating tools of the type adapted to stake all but a trailing portion of a workpiece, of supplemental staking means comprising a full-width flesh-side engaging tool, a flexing member ahead of said tool and movable into and out of cooperative relation therewith, and means for moving said member to stake said trailing portion effectively with the tool as that portion progressively advances. In the illustrated construction the flesh-side contacting tool is in the form of an inclined widthwise-extending blade held substantially stationary during operation and the flexing member is an idler roll suitable for engaging the grain side, the arrangement being such that the acute operative edge of the blade is disposed adjacent to, and between, the feeding means mentioned and the idler roll.

In the illustrative and preferred arrangement there is shown manual means for moving the idler roll into and from operative relation with respect to the relatively fixed blade, but it will be understood to be within the scope of this invention, and as constituting an alternative form thereof, to provide in a staking machine a fixed idler roll and means, manual or powered, to motivate a blade relatively to such fixed roll and the flesh side of the work and so effect through-feed.

A further feature of the invention is the provision in a leather treating machine of a work table mounted to support and guide a workpiece being introduced to cooperative feed rolls, a tool interposed between the table and the rolls for treating a selected portion of the work, the lower end of said table having a hinged portion normally disposed to guide the workpiece in clearing said tool, and operator controlled means for moving said hinged portion to expose the selected work portion to action by said tool.

These and other features of the invention as well as novel combinations of parts will now be described in detail, reference being had to the accompanying drawings of one preferred form of staking machine in which the invention is embodied.

Figure 2:
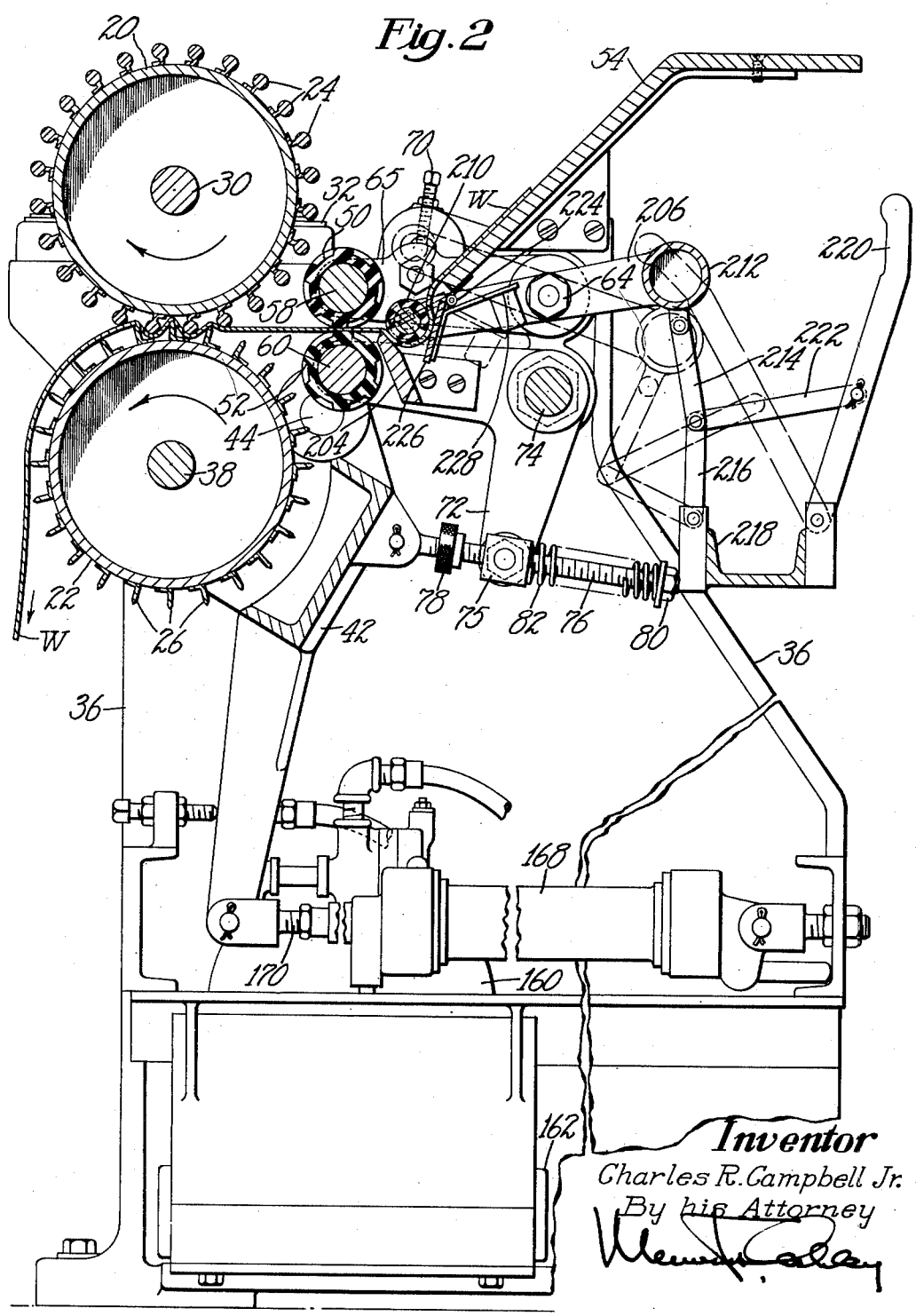

In the drawings,

Fig. 1 is a view in front elevation of the right side of a machine in which the present invention is embodied, portions of the machine being broken away to reveal details of construction, and an idler roll with which the machine is provided being shown in a raised or inoperative position; and Fig. 2 is a vertical section looking to the right, as the machine is seen in Fig. 1, and showing the parts in operating position on the trailing portion of a workpiece.

The illustrative machine is, except for the structure now provided to convert a non-through-feed arrangement to a through-feed organization, substantially identical with that fully disclosed in, and forming the subject matter of, application for Letters Patent of the United States, Serial No. 216,636, filed on March 20, 1951 in my name, and relating to a method and machine for obtaining selective staking. As to those elements common to both the machine there described in detail and the machine hereunder consideration a brief description will hereinafter suffice, common elements bearing like reference characters for convenience. It may be of assistance to note that Figs. 1 and 2 are similar to Figs. 2 and 7 respectively of the non-through-feed machine in the application referred to.

In the illustrated machine a pair of main, rotary cooperative work rolls 20, 22 are power driven and provided respectively with rounded blades 24 adapted to engage the grain side of a workpiece and acute blades 26 adapted to engage the flesh side. The roll 20 has its shaft 30 mounted in bearings 32 carried at each end of the roll 20, said bearings being fixedly mounted on a frame 36 of the machine. The lower work treating roll 22 has its shaft 38 mounted at each end in bearings (not shown) secured to the opposite and upper ends of a swingable member 42 that is pivotally supported by a stud 44 (Fig. 2) threaded in the frame 36 and a stud shaft (not shown) having bearings in the opposite side of the machine frame. The rolls are driven (by means not shown) with opposite direction of rotation as indicated by arrows in Fig. 2.

For swinging the member 42 so as to raise the roll 22 into operative position, means near the base of the machine are provided which comprise an electric motor 160, a tank 162, an hydraulic pump 164, and a cylinder 168 having a piston rod 170 displaceable by fluid pressure upon depression of a treadle 166. In order to feed a workpiece W to the bite of the work rolls 20, 22 an inclined work table 54 is affixed to the front of the frame 36 and a pair of cooperative rotary feed rolls 50, 52 is disposed between the lower end of the table, to be hereinafter further described, and the work rolls 20, 22. The feed rolls 50, 52 are driven by power means (not shown) at a peripheral speed less than that of the tension-inducing work rolls but with corresponding directional effect and act, when in operative position, progressively to grip both sides of the workpiece and thereby retard it to control the rate of feed. The rolls 50, 52 are preferably provided with longitudinally extending ribs of rubber or rubber composition and are respectively affixed to shafts 58, 60. An end of the shaft 58 is provided with a bearing journaled in one end of a plate (not shown) pivotally secured at its other end to the frame 36. The other end of the shaft 58 is journaled in an arm 65 (Fig. 2) fulcrumed on a stub shaft 64 having bearings in the frame. The shaft 60 has end bearings in the corresponding arms of a pair of bell cranks 72 (only one shown) pivotally secured by a tie rod 74 to the frame 36 at opposite sides of the machine.

For yieldingly maintaining adjustable work gripping pressure between the feed rolls 50, 52, means including an adjusting stop bolt 70 is provided to determine the desired upper limit of movement of the roll 50, and heightwise movement of the roll 52 is advantageously controlled by means now to be described. Each lower end of the other arms of the bell cranks 72 pivotally carries a trunnion block 75 having a bore to receive a threaded eye bolt 76 connected to the member 42. The respective eye bolts 76 adjustably carry threaded stop collars 78 and 80, the latter bearing on a spring 82 abutting the block 75. As set forth in the application above mentioned the arrangement just described also assures that the feed rolls 50, 52 will engage both sides of a workpiece before the work rolls 20, 22 and will not release the workpiece until after the work rolls have been operatively disengaged.

The machine organization thus far described successfully stakes full-width hides and skins subjecting each of them progressively, up to a point, to flexure under tension. But with this arrangement a trailing portion of each workpiece, after being released from the feed rolls 50, 52 unfortunately cannot be beneficially treated by the work rolls since this work margin will not thereafter be under adequate tension for staking. The untreated marginal portion, which it is intended shall also be staked (during continuance of feeding movement in the machine) by novel supplemental means about to be described, will be seen (Fig. 2) to extend in the direction of feed a length equivalent to the distance between the bite of the feed rolls 50, 52 and the bite of the work rolls 20, 22, or about 7 to 12 inches, approximately.

For purposes of the present invention a staking blade 204 is fixedly mounted on the corresponding upper arms of the oppositely disposed bell cranks 72, the blade being inclined toward the bite of the feed rolls 50, 52 and its upper and operative edge being rather sharp and adapted to engage the flesh side of a workpiece just prior to its entry between those rolls. A pair of levers 206 (right one only shown) spaced at opposite sides of the machine are respectively fulcrumed on its frame 36, the right-hand lever 206 being pivotally mounted on the stub shaft 64. A core 208 of an idler roll 210 has its ends rotatably supported in bearings formed in rearward extremities of the levers 206, the roll 210 being positioned when depressed to cooperate with the upper side of the blade 204 just below its operative edge and on the opposite side of said blade from the feed rolls 50, 52. The roll 210 accordingly is then disposed effectively, together with the blade, to bend successive work portions progressively and is preferably provided with work-engaging flat ribs extending helically. These may be formed from strips of rubber or rubber composition. Forward ends of the levers 206 provide bearings for supporting a cross bar 212 which has pivotal connection with the upper end of a toggle comprising depending arms 214, 216, pivotally connected together, arm 216 having its lower end pivotally affixed by a pin to a bracket 218 mounted to extend across the front of the frame 36. An operating lever 220, pivotally secured to the bracket 218 approximately above the treadle 166, is connected by a link 222 with the knee of the toggle 214, 216.

Hinges 224 secured to the underside and lower end of the work table 54 support a guide or lip 226 and the latter supports a counterweight 228 adapted, when the idler roll 210 is raised to inoperative position, to position the lip as an extension of the table so as to guide a workpiece over the blade 204 and directly into the bite of the feed rolls 50, 52.

In operating the machine illustrative of this invention, in lieu of the necessity for reversing a workpiece W end-for-end after a leading portion has been staked, the operator will permit the usual staking and feeding of the workpiece to continue until the selected trailing or marginal portion is about to be introduced to the zone of the staking blade 204. He then draws the upper end of the operating lever 220 toward himself so as to lower the idler roll 210 from its inoperative position noted in Fig. 1 to its operative position seen in Fig. 2. The idler roll 210 swings the lip 226 downward against the influence of the counterweight 228 and presses the advancing marginal portion of the workpiece progressively against the blade 204. As the feed rolls 50, 52, with or without the added feeding and tensioning effect of the main work rolls 20, 22, cooperate to pull the trailing marginal portion under tension over the operative edge of the staking blade, the latter and the roll 210 are effective to cause successive portions of the workpiece margin to be spread and flexed and hence staked. When the entire hide or skin has thus been completely treated the operator moves the lever 220 to pivot its upper end away from himself and thereby raises the roll 210. The lip 226 again automatically extends to the top of the blade 204 to assure that the leading portion of the next workpiece clears the blade and is directed to the feed rolls 50, 52.

Having thus described my invention what I claim as new and desire to secure by Letters Patent of the United States is:

1. A through-feed staking machine comprising main staking tools, means for feeding a leading major portion of a spread-out workpiece thereto for treatment, and supplementary staking mechanism mounted in advance of said staking tools to treat the trailing portion of the workpiece, said mechanism including staking members engageable with opposite sides of the advancing workpiece, and means for effectively positioning said members with respect to the trailing portion.

2. A through-feed staking machine comprising main staking tools, cooperative feed rolls for feeding a leading portion of a spread-out workpiece thereto for treatment, and supplementary staking means in advance of said rolls for treating the trailing portion of said workpiece, means for driving said feed rolls continuously to control the rate of feed and degree of tension in the work being treated by said main and supplementary staking means, the latter including a widthwise extending blade and a cooperative roll, and means for relatively moving said blade and said roll into and out of effective staking contact with said trailing portion.

3. The combination with main means for staking a leading major portion of a workpiece under tension, of a flesh-side engageable blade mounted in advance thereof, a grain-side engageable member ahead of said blade, and means for relatively moving the member into cooperative relation with the operative edge of said blade to effect staking of the trailing portion being tensioned by said main staking means.

4. A through-feed machine for staking hides and skins comprising main cooperative work treating members and a pair of cooperative rotary rolls for feeding a spread workpiece thereto under tension, a flesh-side engageable blade normally having its operative edge adjacent to the bite of said rolls and in advance thereof, common means for moving said blade and one of said feed rolls heightwise toward and from operative relation with respect to the other roll, means movable heightwise of the blade to engage the grain side of the workpiece being drawn over the operative blade-edge by said rolls, and operator-controlled means for effecting cooperative flexing action between the grain-side engaging means and said blade to stake a selected portion of the workpiece.

5. A through-feed staking machine comprising main cooperative staking rolls, a pair of cooperative feed rolls for feeding the leading portion of a spread-out workpiece thereto, means for supporting the spread workpiece as it is introduced to the machine, supplemental staking mechanism interposed between the feed rolls and said supporting means, said mechanism including a staking blade and an idler roll cooperative therewith adjacent to the operative blade edge, and manual control means operatively connected with said idler roll for effecting operation of said supplemental mechanism on a trailing portion of the workpiece.

6. A through-feed staking machine comprising main cooperative staking rolls, a pair of cooperative rolls for controlling the feeding of a workpiece thereto, an inclined work support for guiding the workpiece toward the bite of said feed control rolls, supplemental staking means including a member movable into operative position between the feed control rolls and said support to stake a portion of the workpiece as it is advanced, and means at the lower end of the work support automatically operative when said supplemental staking means is inoperative to guide the workpiece directly to said feed control rolls.

7. A through-feed staking machine comprising main cooperative staking rolls, a pair of cooperative rolls rotatable with less peripheral speed than said staking rolls to feed the leading portion of a workpiece thereto under tension, an inclined stationary work support for introducing the workpiece in spread condition to the machine, supplemental staking means ahead of the feed rolls for treating the trailing portion of the workpiece, said means including two work engaging members one of which is relatively movable into cooperative position between the bite of said feed rolls and said support to stake said trailing portion, and a guide pivotally mounted on the support and normally disposed to cause the leading portion of the workpiece to clear said members, said guide being displaceable by movement of said one of said members into operative position to permit the trailing portion of the workpiece to be treated by said supplemental means.

8. A machine as set forth in claim 7, further characterized in that one of said two work-engaging members is a blade and the other is an idler roll.

CHARLES R. CAMPBELL, Jr.

No references cited.